J. B. Stoner,
Ballast.
No. 3,167. Reissued Oct. 20, 1868.
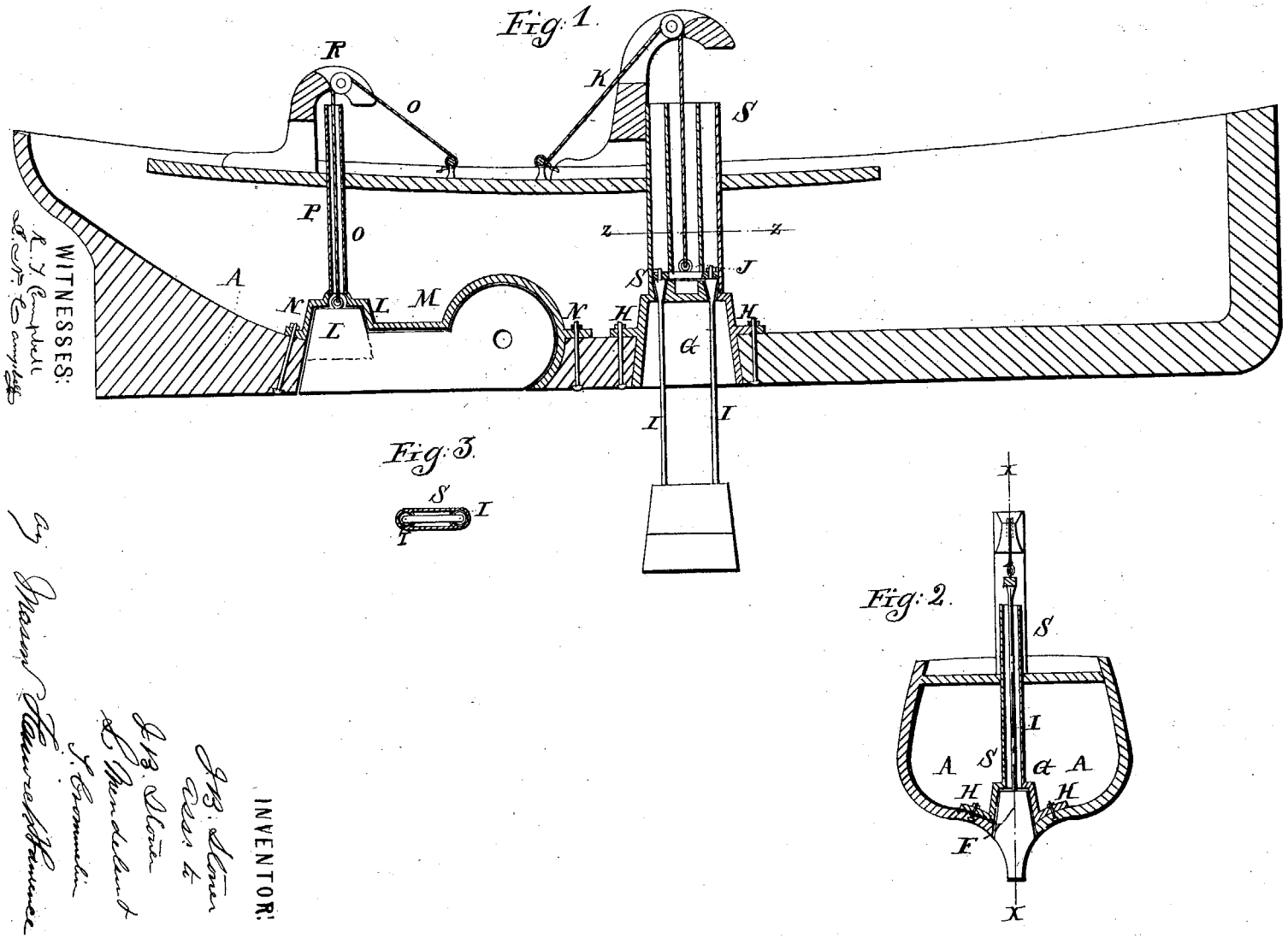
INVENTOR:
J. B. Stoner
Ass. to
J. B. Stoner
L. Mendelent
T. Crommelin
by Mason Fenwick & Lawrence
WITNESSES:
R. T. Campbell
T. M. Campbell
N. PETERS, PHOTO-LITHOGRAPHER, WASHINGTON, D. C.

United States Patent Office.

JOHN B. STONER, LEOPOLD MENDELSON, AND THEODORE CROMMELIN, OF NEW YORK, N. Y., ASSIGNEES OF JOHN B. STONER.

*Letters Patent No.* 74,169, *dated February* 4, 1868; *reissue No.* 3,167, *dated October* 20, 1868.

IMPROVEMENT IN BALLASTING VESSELS.

The Schedule referred to in these Letters Patent and making part of the same.

*To all whom it may concern:*

Be it known that JOHN B. STONER, of the city and county of New York, and State of New York, did invent certain new and useful Improvements in Ballasting Ships, which improvements were assigned in full to himself, LEOPOLD MENDELSON, and THEODORE CROMMELIN, of the same place, and Letters Patent of the United States for the same were issued on the 4th day of February, 1868, in the joint names of STONER, MENDELSON, and CROMMELIN. Now, therefore, we, the said JOHN B. STONER, LEOPOLD MENDELSON, an THEODORE CROMMELIN, do hereby declare that the following is a full, clear, and exact description of said improvements, reference being had to the accompanying drawings, making a part of this specification, in which—

Figure 1 is a vertical section, taken longitudinally through the centre of a vessel, illustrating two modes of carrying out this invention.

Figure 2 is a transverse section, taken through the vessel in the plane indicated by the course of red line *y y* in fig. 1.

Figure 3 is a detail view, taken through line *z z* in fig. 1.

Similar letters of reference indicate corresponding parts in the several figures.

This invention relates to certain novel improvements on ballasting vessels, wherein weights, which are suspended a considerable distance below the keels of vessels, are employed for preventing them from oversetting while carrying sail.

The nature of this invention and improvement consists in providing for steadying large vessels, so as to allow them to carry sufficient sail when not loaded, by the use of one or more heavy weights, which are located at some point between the bow and stern, and so arranged that they can be lowered considerably below the vessel's keel, according to the depth of water, said weight or weights being provided with chambers, formed for their reception in the hull of the vessel, so that, when necessary, they can be elevated into these chambers, and thus prevented from offering any obstruction to the progress of the vessel through the water, as will be hereinafter explained.

Previous to this invention, we are aware that "centre-boards" have been constructed of metal, and so applied to boats that they could be raised or depressed at pleasure; but centre-boards are chiefly designed for steadying small boats, by the resistance of the water upon their flat surfaces, and in this respect they differ from a heavy weight, which can be lowered a considerable distance below the keel of a vessel, and which operates, chiefly by gravity, to counterbalance the force tending to capsize a large vessel; furthermore, "centre-boards" which would operate successfully could not be practically applied to very large vessels.

We are also aware that in the year A. D. 1857 a patent was granted in Great Britain for a mode of ballasting boats, which consisted of a weight made in the form of a wheel, and applied so that it would turn between the free extremities of two rods, which rods were pivoted to the sides of the boat amidships, and provided with a rope, by which they could be swung down to a perpendicular position with respect to the keel of the vessel, or raised so that the weight would be at the stern of the vessel. The weight was made circular, so that in shallow water it would roll upon the bottom, and the rods were pivoted to the vessel, so that they would allow the weight to swing back more or less, according to the depth of the water, and also allow the weight to be raised or lowered.

To enable others skilled in the art to understand the invention of JOHN B. STONER, we will describe its construction and operation.

In the accompanying drawings, A represents the hull of a vessel. F is a weight, which may be lowered and raised vertically, the lower part of which is so formed that when raised into and secured in the recess G, formed for its reception, its lower outside or exposed surface will conform to and coincide with the form of the vessel's bottom, thereby offering no resistance to the movements of the vessel through the water.

The walls of the recess G, for the reception of the weight F, are formed of metal, or other suitable material, set and secured in a hole cut through the bottom of the vessel. The part of the vessel weakened by cutting said hole will be strengthened by metallic flanges or plates, H, formed upon or firmly attached to said walls, and securely bolted to the vessel's hull, as shown in figs. 1 and 2.

From the top plate of the recess G to the deck, or some other convenient part of the vessel, extends a well or tube, S, having pipes or tubes formed in its narrow sides, said tubes being slotted upon their inner sides from their upper ends nearly to their lower ends.

To the upper side or end of the weight F are securely attached the lower ends of the rods I, the upper ends of which are connected by a short cross-bar, J, which moves up and down, as the weight F is raised or lowered, through the slotted sides of the tubes in the well S. The upper ends of the rods I, just below the cross-bar J, are enlarged, or made cone-shaped, to fit into the contracted or conical-shaped lower parts of the tubes in the well S, through which the rods I move up and down. To the central part of the cross-bar J is attached a rope-chain, K, which passes over a pulley, attached to some suitable support above the upper end of the well S. By means of this rope or chain the weight F can be raised or lowered, and secured at any desired distance below the vessel's keel, or raised and secured within its recess, G.

In fig. 1 another mode of carrying out the invention is illustrated, and consists in applying a weight, L, to the free end of a longitudinally-vibrating arm, M, which arm is fitted and pivoted in a recess formed in the bottom of the vessel in the vertical plane of the keel. This part of the vessel, which is weakened by making the recess for receiving said arm, and also the weight L, is strengthened by flanges N, formed upon or firmly attached to the walls enclosing said recess, and securely bolted to the bottom timbers of the vessel.

O is a rope or chain, which is attached to the weight L, and which passes up through a tube, P, over a pulley, R, and is attached to some suitable support above the upper end of the tube P, the free end of this rope or chain being secured to some suitable object.

From this description, it will be seen that, when the weight which is employed for ballasting the vessel is not required for this purpose, it can be raised into a recess made within the hull of the vessel, so as to be out of the way of everything, and so as not to offer resistance to the passage of the vessel through the water.

Having thus described this invention,

What we claim as new, and desire to secure by Letters Patent, is—

1. A ballasting-weight, L, applied on the free end of a swinging arm, in combination with a recess made in the hull of a vessel, to receive said weight and arm, and a tube, P, substantially as described.

2. The use of one or more weights, secured to stiff rods, and applied to a vessel in such manner that they can be lowered considerably below a vessel's keel, or raised and secured within recesses formed in the bottom of a vessel, substantially as described.

3. A temporary ballast, consisting of a weight secured to the lower ends of one or more rods, and adapted to fit into a socket formed in the vessel, and operated from the deck, said rods being suitably enclosed within a tube rising from said sockets, substantially as specified.

JOHN B. STONER.
LEOPOLD MENDELSON.
THEODORE CROMMELIN.

Witnesses:
N. GANO DUNN,
WILLIAM STAINTON.